(12) United States Patent
Ubillos

(10) Patent No.: US 7,617,454 B2
(45) Date of Patent: Nov. 10, 2009

(54) ACCELERATOR HANDLES

(75) Inventor: Randy Ubillos, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 505 days.

(21) Appl. No.: 11/184,296

(22) Filed: Jul. 18, 2005

(65) Prior Publication Data

US 2005/0257171 A1    Nov. 17, 2005

Related U.S. Application Data

(63) Continuation of application No. 09/226,526, filed on Jan. 4, 1999, now Pat. No. 6,938,217.

(51) Int. Cl.
*G06F 3/00* (2006.01)
*G06T 13/00* (2006.01)

(52) U.S. Cl. ............... 715/716; 715/723; 715/726; 345/474; 345/442

(58) Field of Classification Search ............... 715/835, 715/810, 716, 719, 723, 726, 769; 345/442, 345/474, 441, 121
See application file for complete search history.

(56) References Cited

U.S. PATENT DOCUMENTS

| 4,858,140 | A | * | 8/1989 | Buhler et al. | ............... 700/189 |
| 5,053,760 | A | * | 10/1991 | Frasier et al. | ............... 345/473 |
| 5,513,303 | A | * | 4/1996 | Robertson et al. | ........... 345/419 |
| 5,717,848 | A | * | 2/1998 | Watanabe et al. | ........... 345/474 |
| 5,923,561 | A | * | 7/1999 | Higasayama et al. | ........ 700/186 |

* cited by examiner

*Primary Examiner*—Tadeese Hailu
(74) *Attorney, Agent, or Firm*—Blakely, Sokoloff, Taylor & Zafman LLP

(57) ABSTRACT

A method and apparatus is described to control velocity of object movement in a display device. A path is provided that the object will follow in the display. A plurality of handles are provided along the path and a velocity of the object is controlled by using the handles.

25 Claims, 8 Drawing Sheets

ACCELERATOR HANDLES

This application is a continuation application of U.S. patent application Ser. No. 09/226,526, filed Jan. 4, 1999 now U.S. Pat. No. 6,938,217.

BACKGROUND

I. Field of the Invention

The present invention relates to video editing. In particular, the present invention relates to object movement in a display device.

II. Related Art

Editing is generally the art of making subtle adjustments to a material or materials in a form that communicates a message to be conveyed with maximum impact. In the area of video editing, the editor defines and shapes images and/or audio until the message to be delivered is accomplished. Generally, video editing may be divided into two categories: linear video editing and non-linear video editing. In linear video editing, the images are taken in a sequential order. Stated differently, one idea after another must be previously conceived and then, the videos are taken in the conceived chronological sequence. For example, suppose a videotape is to be taken of an office, the editor must first conceptualize as to what the scenes would be and in which sequence. The editor may want to take a video of an entry into the Office. This scene perhaps followed by a focus on a pot plant in a corner. The scene may then move to the various articles on a desk and then, the scene shifting its focus to a window. In linear video editing, these are the precise sequences that the video must be taken.

By contrast, in non-linear video editing, scenes may be taken in any order and later edited according to a desired sequence. Whether linear video editing or non-linear video editing approach is to be taken generally depends on the video system that is to be used. While non-linear video editing system may be more complicated, the advantage is that images may be taken in any sequence and later, through careful observation of the images and a thoughtful process, the images may be manipulated to communicate the message in the manner the editor wishes to convey with maximum impact. Due to its free format, the editor can readily impute creativity without being constrained physically.

With the advancement of computer technology, further improvements have been made to the video editing system through a process called digitization. In particular, digitization of images have had a profound impact on non-linear video editing system. Previously, copies of a film containing the images would be made. By cutting and splicing the copies, an edited version of the original film is made. If the editor was not satisfied, further copies of the original film were made and the cutting and splicing would resume until a desired product was obtained. In a digital video editing system, images are stored in an electronic medium such as magnetic discs or laser discs thereby allowing the images to be retrieved randomly and displayed on a display device such as a monitor. This alleviates the burdensome technique of cutting and splicing. Further, in random access, each image operates independently, thus, it is possible to retrieve particular images without sequentially going through other materials to reach those images. Examples of sequential access would be films or magnetic tapes. By allowing images to be accessed randomly, images may be easily manipulated into any desired sequence which is the heart of a non-linear editing system.

In many instances of video editing, messages can be enhanced by using special effects. For example, a digital video system may allow a sequence of images or a still image in a frame that occupies a portion of a display to move within a display. Another example of special effects may be the zooming in and out of images. These digital video effects previously required sophisticated processing and thus, were handled at offsite laboratories. However, with the advent of powerful processors, special effects may be easily performed within the video editing system itself. As digital editing systems become more and more sophisticated, more capabilities and functions are incorporated within the systems. This in turn equates to more and more complicated digital processing techniques becoming available to the editor. However, if a special effect requires too much effort on the part of the editor to use the feature, too much effort is put into creating the feature rather than editing the feature. Generally, this causes the editor to become inefficient in editing the images. More likely, the editor will not use those special effects which are burdensome.

Accordingly, it is desirable to make a video editing system that is easy to use and does not burden the editor. One method to achieve this is the graphic user interface (GUI). An excellent GUI may be one that is intuitive and arranged in such a manner that is easily comprehensible by visually looking at the screen. Stated differently, the editor, by looking at the screen should know how the feature operates rather than referring to a manual every time a feature is to be used. Turning back to a special effect feature described above, in a video editing system, having sequence of images or still image that occupies a portion of the screen to move within a display device is a desirable feature that an editor may want to use to emphasize a message, for example. To go one step further, the sequence of images or still image may be moving along a path within another sequence of images or still image. The movement may be further enhanced by controlling the velocity in which the sequence of images or still image is moving across the display.

In one method, a window corresponding to the path of the moving sequence of images or still image is opened and provides a feature to control the velocity along the path. The feature is in a form of a velocity graph from which the editor calculates the various velocities along the path. In using the velocity graph, because the editor has to calculate the various velocities, it is rather complicated and may deter the editor from using the feature. Further, the editor may have to search the display to find an icon that opens the velocity graph window. Generally, when the editor is editing a sequence of images on the display, the editor may have opened several windows to edit the images. By opening the velocity graph window, the editor may have to shrink the window with a work product to accommodate the velocity graph window. By shrinking the work product window, the editor may not clearly observe what is occurring in the work product window thereby producing an undesirable work product. Therefore, it is desirable to allow the editor to manipulate the velocity of a moving sequence of images or a still image with ease and without cluttering the display of the video editing system.

SUMMARY

A method and apparatus is described that to controls velocity of object movement in a display device. A path is provided that the object will follow in the display. A plurality of handles are provided along the path and a velocity of the object is controlled by using the handles.

Other features and advantages of the present invention will be apparent from the accompanying drawings and detailed description to be followed.

BRIEF DESCRIPTION OF THE DRAWINGS

The present invention is illustrated by way of examples and not as limitations in the figures of the accompanying drawings in which.

DETAILED DESCRIPTION

Figure 1A:
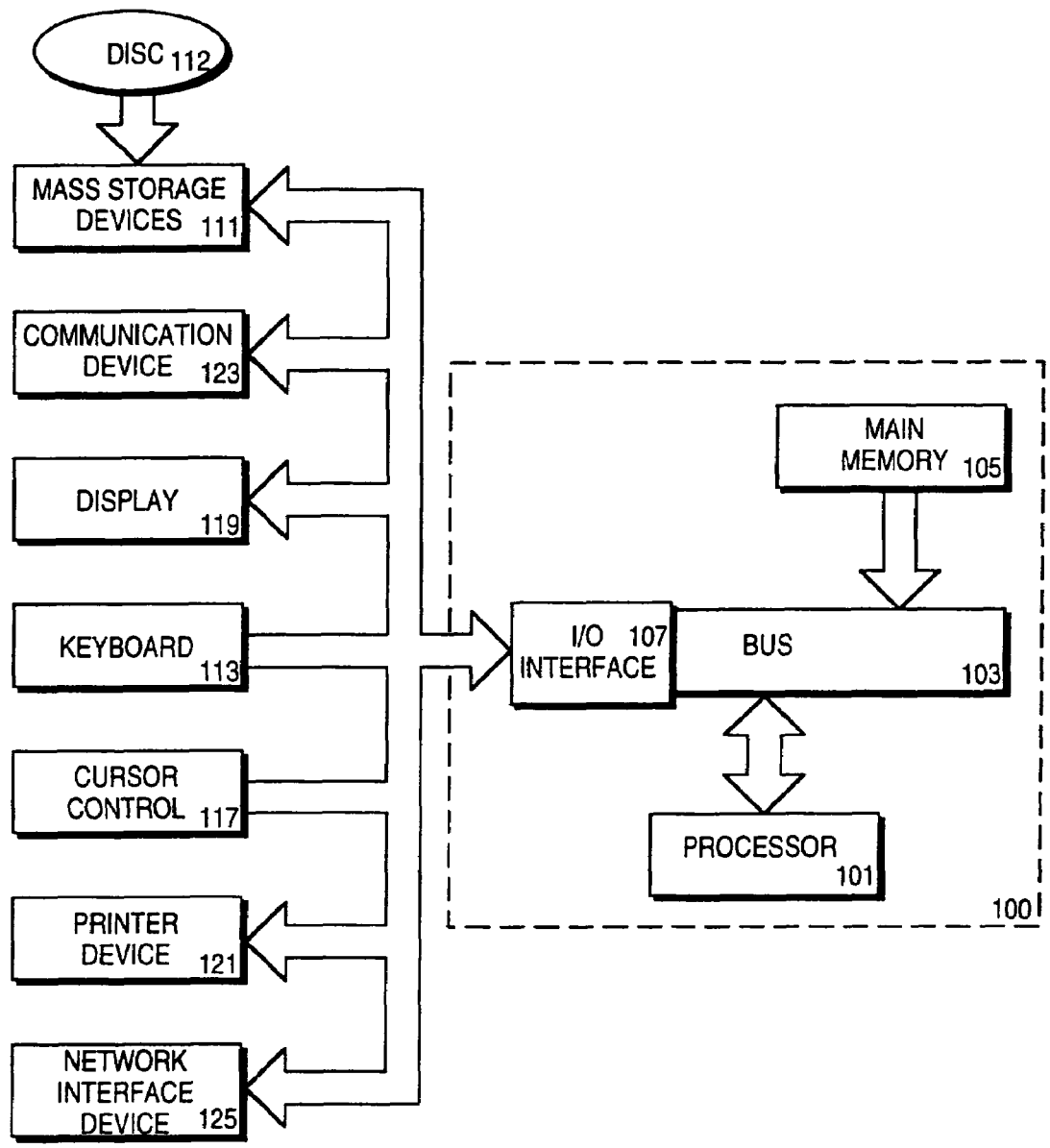
FIG. 1a is a diagram of a computer system that may contain an embodiment of the invention.

FIG. 1a is an example of a computer system 100 in which an embodiment of the invention may be incorporated. The computer system 100 may comprise a processor 101 coupled to a main memory 105 via a bus 103. The main memory 105 may be dynamic random access memories (DRAMs) or other suitable memories. Data and instructions may be stored in main memory 105 which are processed by the processor 101. Generally, coupled to the bus 103 may be a read only memory (ROM) that may store basic input/output (I/O) instructions (BIOS) and various controllers such as memory management unit (MMU), interrupt controller, video controller, direct memory access controller (DMA) and input/output(I/O) controller, among others, all which are not shown in the figure. Further coupled to the bus 103 may be an I/O interface 107 through which various I/O devices may be coupled. Examples of I/O devices may be mass storage devices 111 such as magnetic disc drives and/or optical disc drives, an alphanumeric input device 113 such as a keyboard, a cursor control device 117 such as a mouse or a trackball, a display device 119 such as a monitor or a liquid crystal display (LCD), a printer device 121 such as a printer, a communication device 123 such as a modem and a network interface device 125 such as ethernet.

Figure 1B:
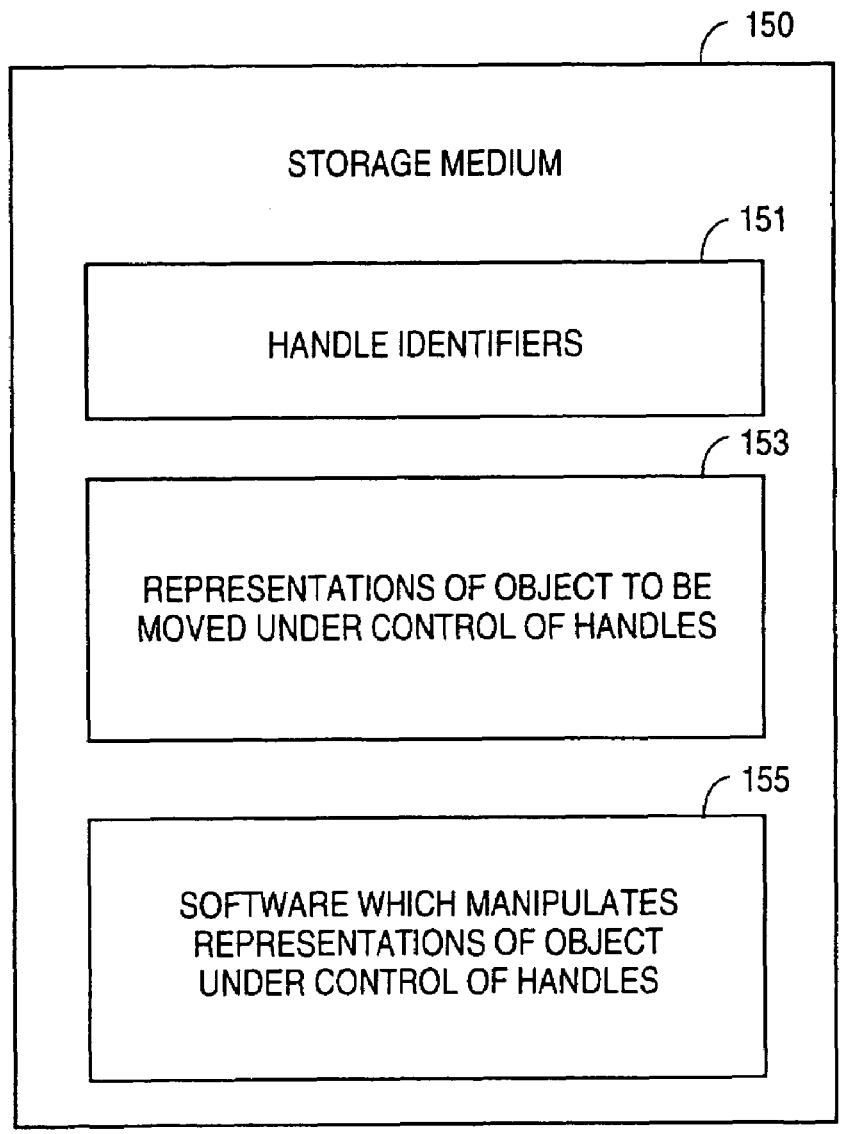
FIG. 1b is a diagram of a storage medium that may contain an embodiment of the invention.

The computer system 100 described above is readily available commercially. Preferably, The computer system 100 be one of the Macintosh® family of personal computers such as the Macintosh® Quadra™, Macintosh® Performa™, PowerMac® brand personal computers manufactured by Apple Computer®, Inc. of Cupertino, Calif. The processor can be one of the Power PC family of microprocessors such as the 604 or G3 PowerPC® such as those manufactured by Motorola®, Inc. of Schaumburg, Ill. However, other systems and processors may be used. Generally, the present invention may be stored in a mass storage device 111 or a storage disc 112, which may be magnetic or optical, until such time the processor 101 retrieves from storage and down loads into the main memory 105 for processing. FIG. 1b is an example of a storage medium 150 which may be random access memory (RAM), hard disk, compact disc and/or magnetic disc, among others. The storage medium 150 may comprise handle identifiers 151 that provide control of object movements; object representations 153 that are to be moved under the control of the handles; and software 155 which manipulates representations of object under control of handles. Further details of these features will be described with respect to FIGS. 3-9. Processor 101 processes the data and instructions from the main memory 105. Command selections and information to direct the flow of data and instructions to the processor 101 may be performed by a user via the alphanumeric device 113 and/or cursor control device 117 or voice recognition. The results may be displayed on a display device 119.

Figure 2:
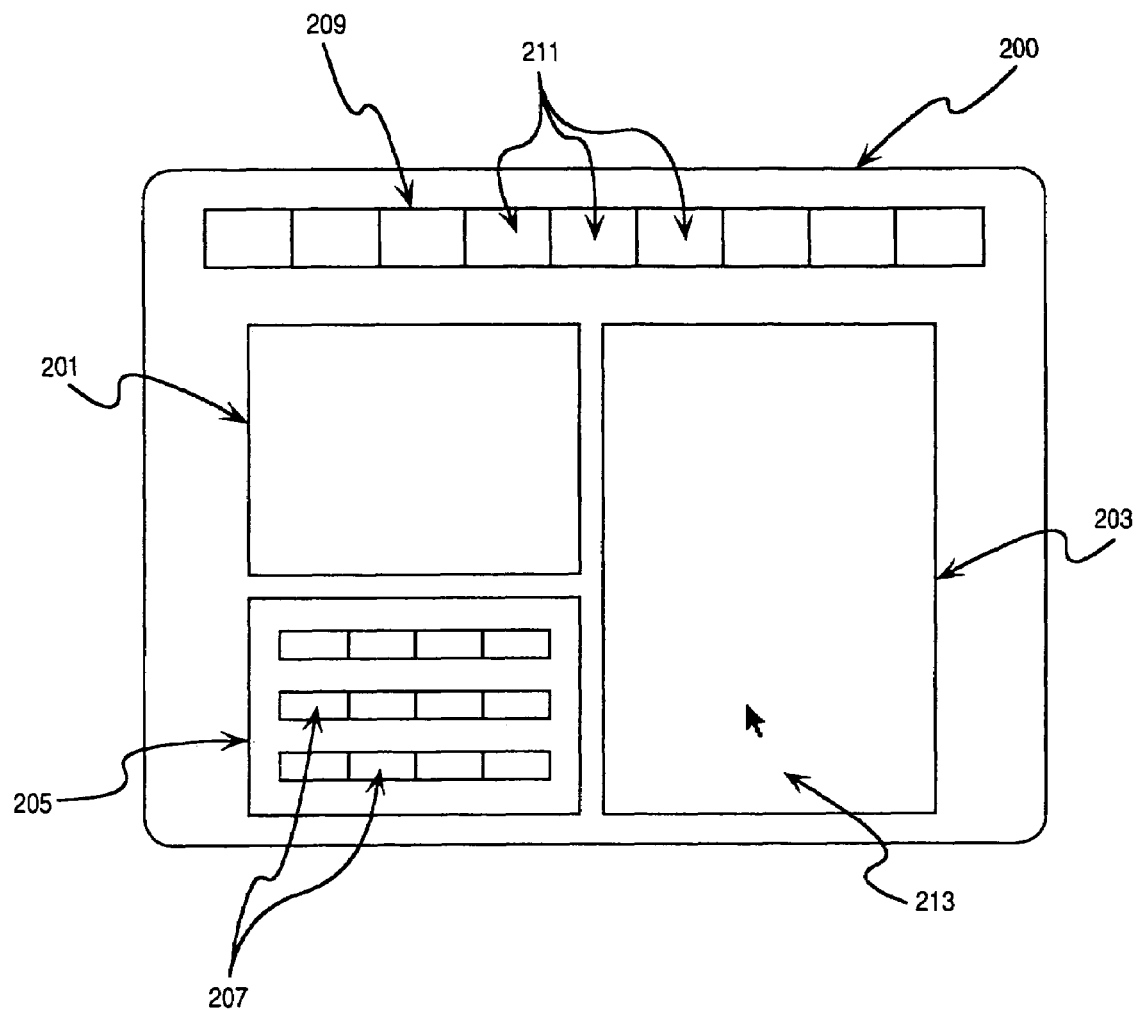
FIG. 2 is a diagram of a Graphics User Interface (GUI)

FIG. 2 is an example of a graphics user interface (GUI) 200 that may be used with an embodiment of the invention. However, other user interfaces may be used according to a desired result by the designer. The GUI 200 is displayed on a display device 119 (See FIG. 1a) and aids the user in controlling the flow of data and instructions to the processor 101. Typically, the GUI 200 may comprise a plurality of windows, some which may be opened by the processor 101 according to data and instructions and some which may be opened by the user. The figure illustrates three windows 201, 203, 205 that are opened. As an example, in a video editing system, window 201 may display an object that is to move on a path within the display. The object may be a sequence of images, a still image, alphanumeric characters or a design, both animation or real, created by the user. Window 205 may display an editing panel 207 that is configured to edit the various objects displayed in window 201. For example, the editing panel 207 may have various controls that allow the user to cut and paste various images to form a sequence of images. Another set of controls, for example, may control the time duration of the sequence of images to be edited. Yet another set of controls, for example, may control an audio sound corresponding to the images. Generally, the editing panel 207 will provide various controls that the designer believes would be useful to the user in editing the various images. Window 203 may display an object in which the object in window 201 may move within, for example. As an example, window 203 may display a sequence of images or still image in which the images in window 201 that are contained in a frame will move along a path in window 203. This feature will be further described with respect to FIG. 3.

GUI 200 may further include a palette of icons 209 that may control the various features of the video editing system. Within the palette 209 may be a plurality of icons 211 where when an icon is activated, a new feature may be introduced into the video editing system. Typically, the activation of the various icons 211 in the icon palette 209, the manipulation of various controls in the editing panel 207 and the editing within the various windows may be performed by a pointing arrow 213. The pointing arrow 213 may be operated by the user through the I/O device such as the cursor control device 117 (e.g. a mouse or trackball) or the alphanumeric device 113 or by speech recognition. To demonstrate an operation of the GUI using the mouse as an example, if a duration of a video is to be cut, the mouse may be mobilized on a surface that in turn moves the pointing arrow 213. When the pointing arrow 213 reaches a control on the editing panel 207 that controls the cutting of video sequences, several clicks of a button located on the mouse may cut a video sequence. To store the video sequence that has been cut, the pointing arrow 213 may be mobilized once more until it reaches a store icon in the icon palette 209. With a click of a button on the mouse, the video sequence may be stored in a mass storage device 111 to be retrieved when the user requires it.

Figure 3:
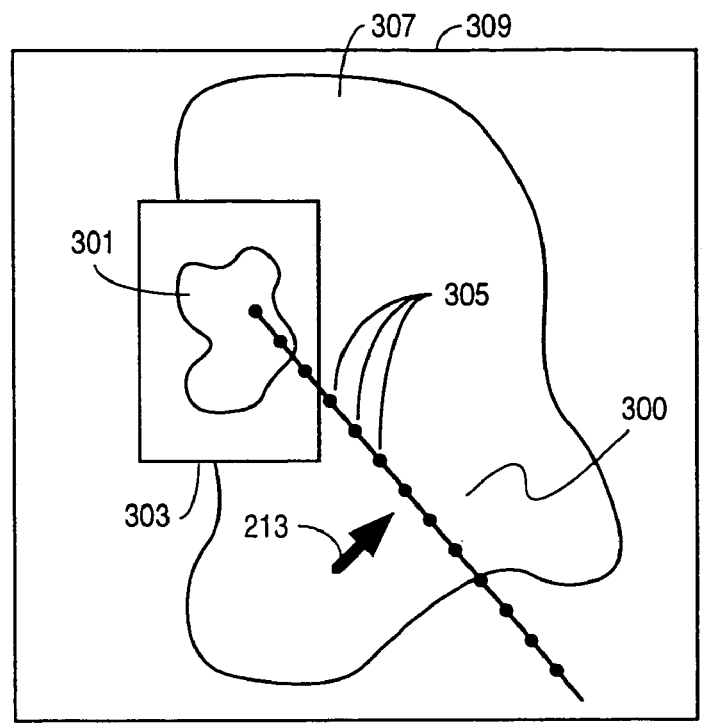
FIG. 3 illustrates a path with accelerator handles according to an embodiment of the invention.

FIG. 3 illustrates a path 300 drawn on a display device 119 (see FIG. 1a) in which an object 301 may move according to one embodiment of the invention. The object 301 may be contained in a frame 303 as illustrated. In one example, object 301 and frame 303 may be moving within another frame 309 containing another object 307. The objects may be still image or may be a sequence of images. Note that object movement may not be limited to one object. For example, the frame 303 of object 301 may be moving in the frame 309 of object 307 and the frame 309 may be moving in another frame of another object (not shown) and so forth. Located at intervals along the path 300 are a plurality of "accelerator handles" 305 that determine the velocity of object 301 moving along the path 300. In one embodiment, the spacings between the accelerator handles may represent the speed control of the object 301. Alternatively, the size or color or other signal attribute may represent the speed control. The setup criteria of the path 300 may be initialized by the user or may be automatically initialized by the processor 101 according to data and instructions stored in the main memory 105. The setup criteria may comprise a length of the path, a number of accelerator handles, spacing between the accelerator handles, and the velocity between the accelerated handles, among others. Generally, during setup, the spacings between the accelerator may be equal and thus, only one velocity may be designated. In the event it is processor determined, the user may further adjust the setup criteria using the cursor control device 117 or the alphanumeric device 113 or by speech recognition.

In one embodiment, the editing panel 207 (see FIG. 2) may include controls that allow the adjustment of the length of the path and the number of accelerator handles and/or velocity between spacing. Using the mouse as an example, the pointing arrow 213, controlled by the mouse, may be moved until it reaches the appropriate controls in the editing panel 207. By manipulating the controls, appropriate adjustments may be made.

In another embodiment, adjustments may be made directly on the path and the accelerator handles themselves. Again, using the mouse as an example, the pointing arrow 213 may be moved until it is at or near a tip of the path 300. By holding down the button on the mouse; "dragging" the tip of the path 300 to another location; and releasing the button, the length or perhaps, even the position of the path, may be adjusted. Regarding the number of accelerator handles, the numbers may be changed by moving the pointing arrow 213 until the pointing arrow 213 is located on or near the path 300. By clicking the button on the mouse, the number of accelerator handles may be increased by one or other predetermined number. Accelerator handles may be decreased by causing the pointing arrow 213 to be located on or near an accelerator handle; holding down the button on the mouse; and dragging the accelerator handle to a "trash can". Alternatively, the accelerator handle may be deleted by double clicking the button on the mouse, for example. Regarding velocity, with the pointing arrow 213 on a spacing between two accelerator handles or the handle itself, a double click of the button on the mouse may open up a dialog box. The velocity may be entered in the dialog box using the alphanumeric device 113 or speech recognition, for example.

Figure 4:
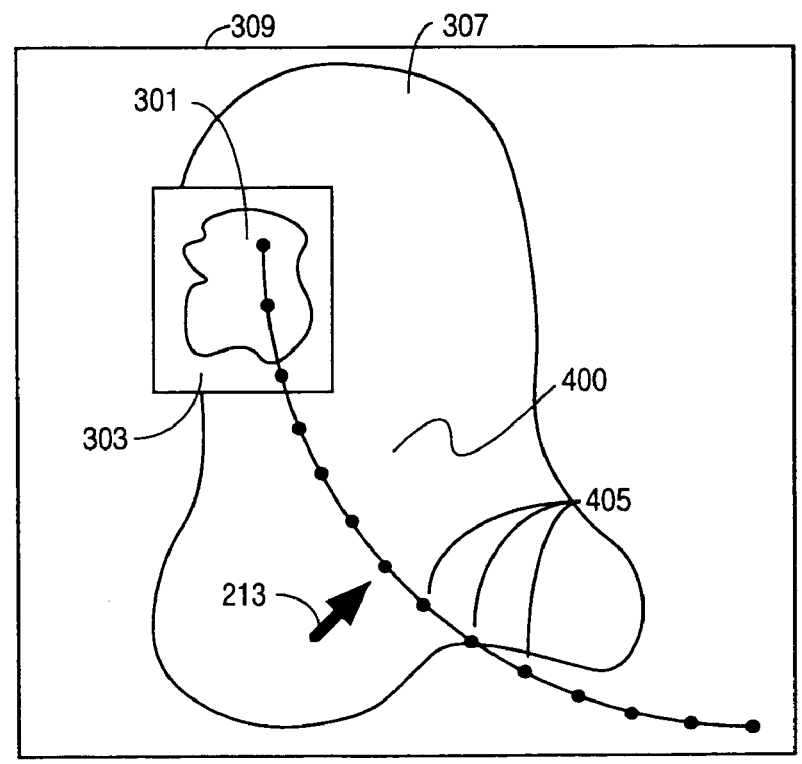
FIG. 4 illustrates a changed path shape according to one embodiment of the invention.

FIG. 4 illustrates how path 300 may be changed. For example, using the pointing arrow 213 which may be controlled by a mouse, the user may move the pointing arrow 213, to a desired location on or near the path 300. By holding the button down on the mouse and moving the mouse, the path may be dragged from its original shape 300 to a new shape 400. Once a desired shape of the path is obtained, the release of the button fixes the shape of the path. In this example, the straight path 300 has been changed to form a curved path 400. Note that the length of the path 400 may be longer than the length of the path 300. Because of the change in the length of the path, the accelerator handles 305 may shift from its original position to a new position (shown as accelerator handles 405) where the accelerator handles maintain equal spacing relative to each other. Thus, when adjustment to the length of the path or the number of accelerator handles is made, the accelerator handle positions automatically readjust to accommodate the adjusted path length or the change in number of accelerator handles. Other approaches may be taken when the length of the path is adjusted or the number of accelerator handles change.

Figure 5:
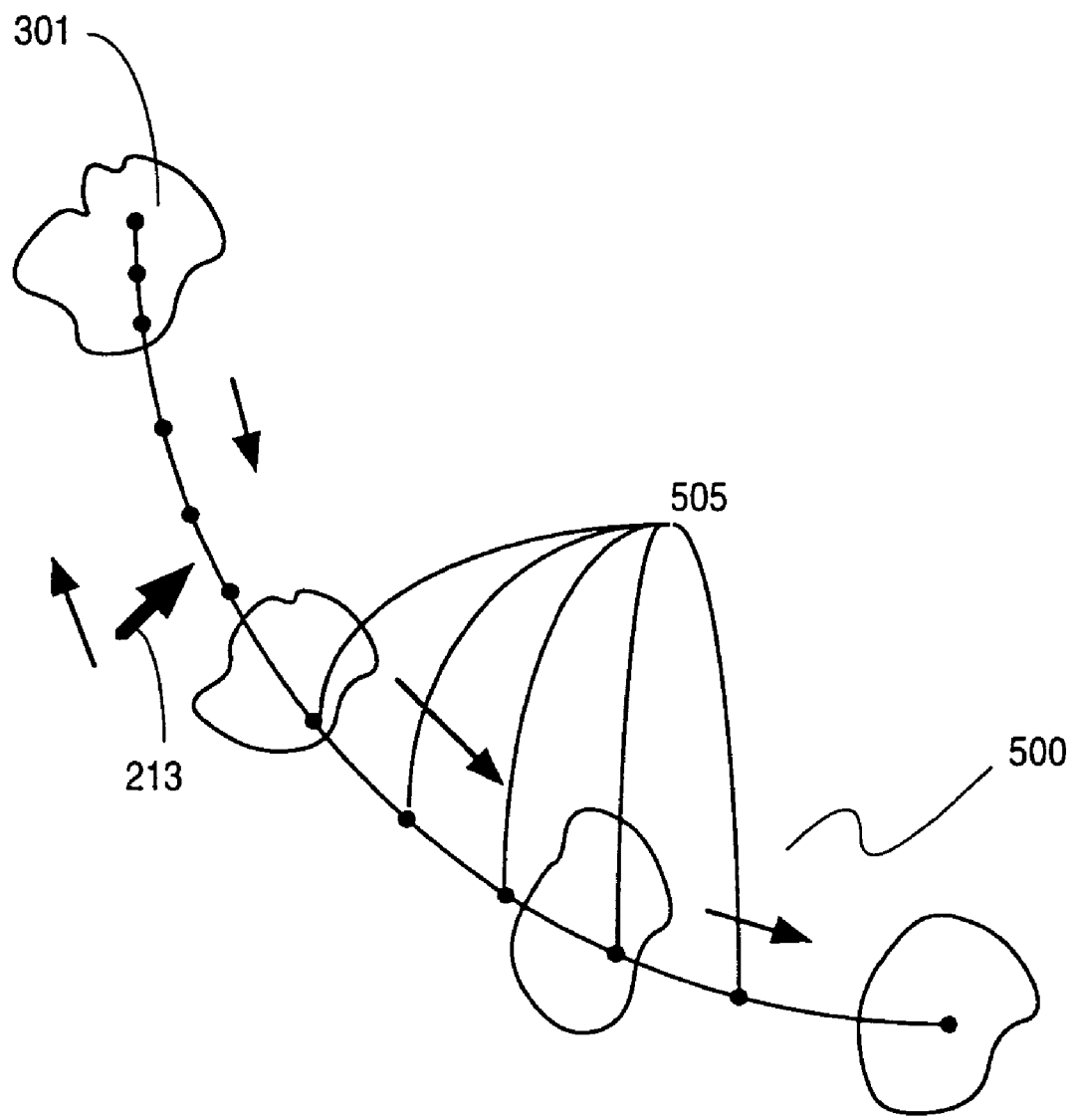
FIG. 5 illustrates a changed velocity in the path by manipulating the accelerator handles according to one embodiment of the invention.

FIG. 5 illustrates an example of a position of accelerator handles 505 that have been changed to produce an object movement of different velocities along the path 500. In one embodiment, the pointing arrow 213 may be used by placing the arrow on or near a desired point in the path to effectuate the movement of the accelerator handles. For example, by holding down the button on the mouse and moving the arrow 213 in the direction in which a slower velocity is desired, the action will cause the accelerator handles to compress with respect to each other such that the spacings between the accelerator handles become shorter. For the accelerator handles on the opposite side of the pointing arrow, the spacing between accelerator handles increase to accommodate the increase of the path in the region. This aspect is illustrated in FIG. 5.

The change in velocity may be determined by the change in spacing between two accelerator handles in relation to its previous spacing. Stated differently, where the spacing between two accelerator handles is closer compared to previously, the object may move at a slower rate between those two accelerator handles. If the spacing between the two accelerator handles is wider than previously, the object may move at a faster rate. Of course, the relationship between the velocity and the spacings between the accelerator handles described above is one example that may be chosen by the designer. For example, one may design such that if the spacing between the two accelerator handles is closer, the object moves at a fast rate and if the space between the two accelerator handles is wider, the object moves at a slow rate.

According to one example, to provide for a non-linear adjustment of changes in the spacings between the accelerator handles 505 as to provide a smooth acceleration path, the spacings may be changed according a mathematical formula. For example, using a logarithmic formula, where the length of a spacing has changed, the remaining position of the accelerator handles may change logarithmically using the changed spacing as a reference, for example. The logarithmic positioning of the accelerator handles 505 is illustrated in FIG. 5. FIG. 5 further illustrates the object 301 descending along the path 500. In the initial descent, the object may move at a slow velocity. As the object descends further, the object may accelerate. During the last moment of descent, the object may be at its fastest velocity.

Figure 6:
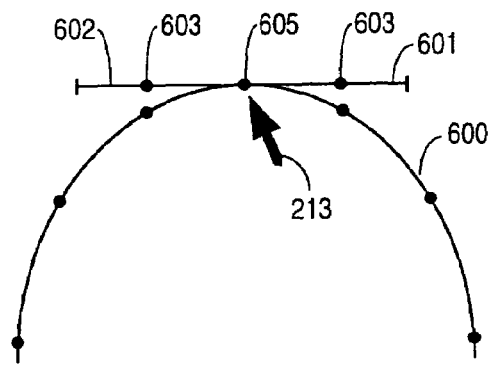
FIGS. 6-8 illustrate another example of changing velocity in the path using accelerator handles according to one embodiment of the invention.
Figure 7:
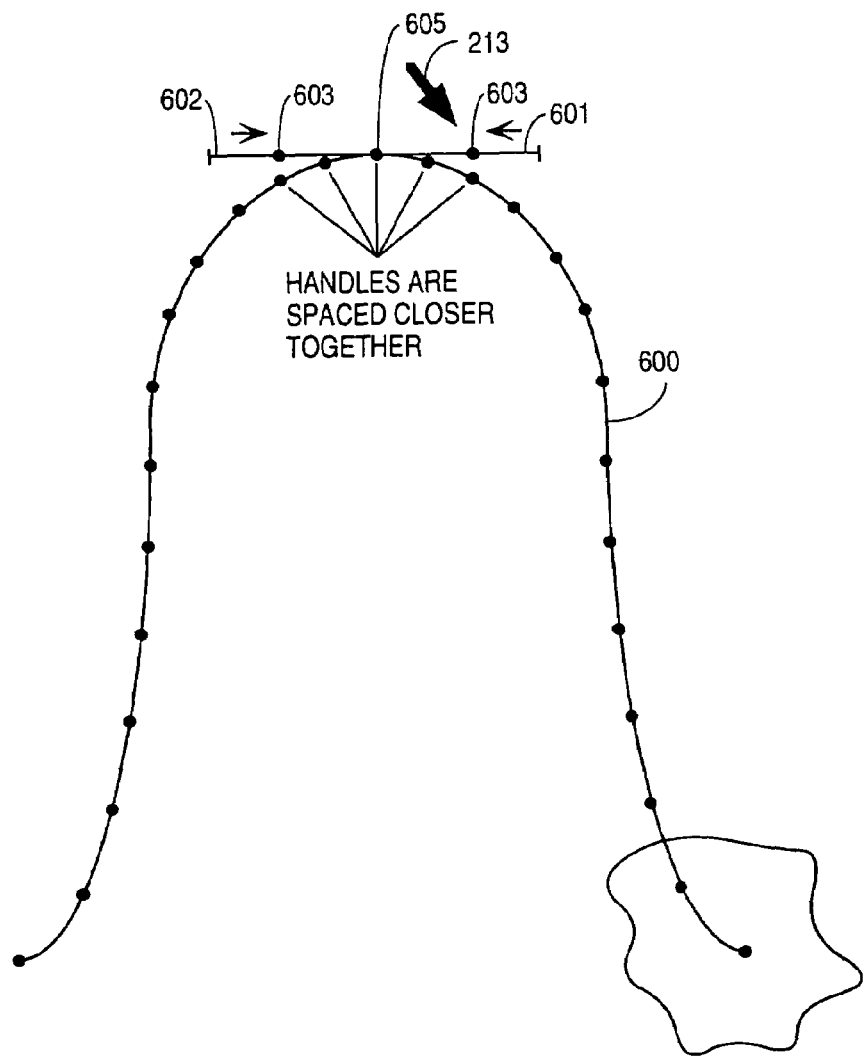
Figure 8:
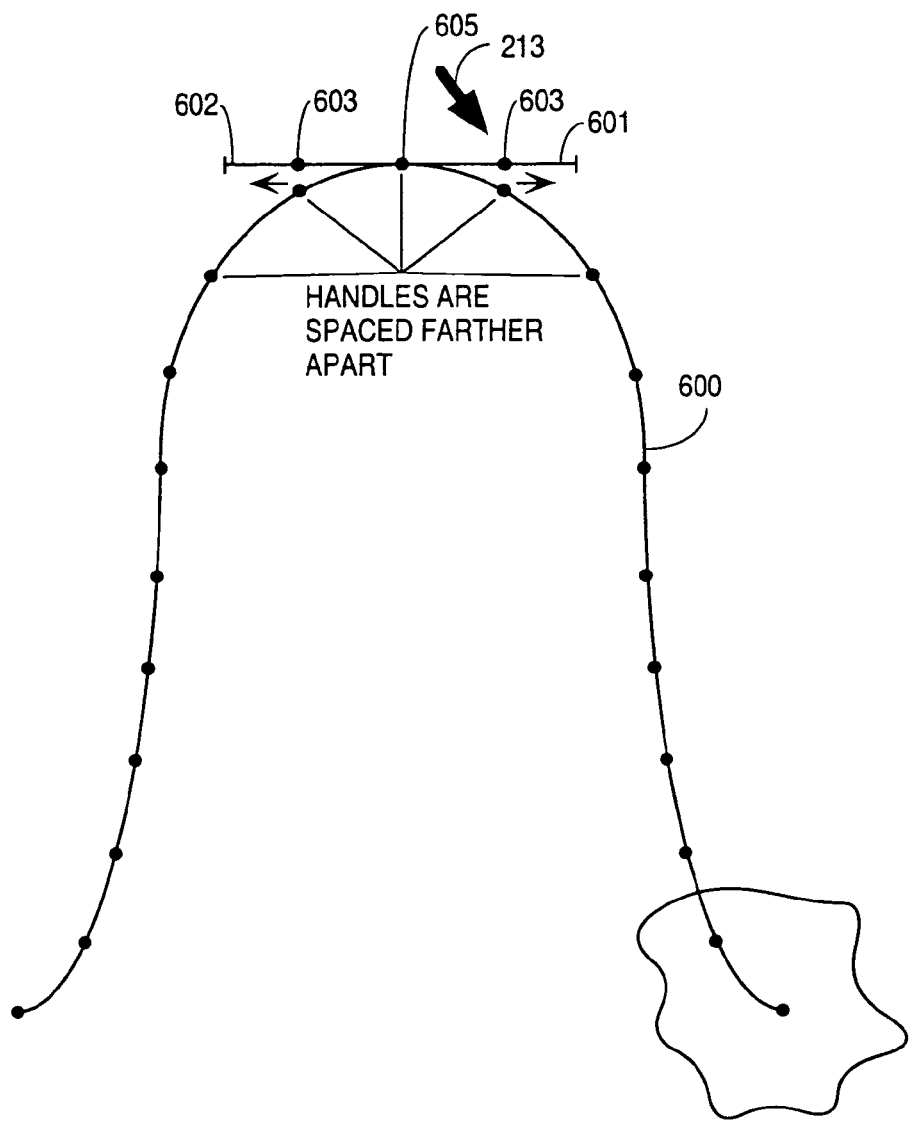

FIGS. 6-8 illustrate another example that may be used in controlling a velocity of an object on a path. According to one embodiment, at the initial stage, the spacings between the accelerator handles may be equal. To change velocity in the path 600, the arrow 213 may be moved to an accelerator handle 605 on the path 600 in which a change in velocity is desired. In one example, a click of a button on the mouse will cause a bar or a plurality of bars 601, 602 to appear. In the case of a plurality of bars, for example, two bars, according to one embodiment, the right bar 601 may control the velocity of the path 600 on the right side of the accelerator handle 605 and the left bar 602 may control the path 600 on the left side of the accelerator handle 605. In one example, an adjustment of velocity using one bar may be mirrored on the other bar. In another example, an adjustment of velocity on the bars may be separately manipulated.

One bar will be used as an example to illustrate the feature of the bar. Centered at or near to the center of the bar 601 may be a point 603 that may be used to control the velocity of the object moving in the path 600. Note that other point positioning may be used such as placing the point at one end of the bar, Turning back to the previous example, at its initial center or near center position, there may be no change in velocity. This position is termed center position. Using the arrow 213, the position of the point 603 on the bar 601 may be moved to effectuate change in the velocity. Referring to FIG. 7, according to one example, when the point 603 is moved in the direction of the accelerator handle 605, the other accelerator handles in the vicinity may move closer to the accelerator handle 605 according to a mathematical formula. The closest the point 603 may move in the direction of the accelerator handle 605 on the bar 601 is termed the minimum position. Referring to FIG. 8, according to one example, when the point 603 is moved away from the direction of the accelerator handle 605, the other accelerator handles in the vicinity may move further apart from the accelerator handle according to a mathematical formula. The farthest the point 603 may move away from the direction of the accelerator handle 605 on the bar 601 is termed the maximum position.

According to one embodiment, the algorithm for adjusting the spacings between the handles according to the movement of the point in the bar may be expressed as:

$$\text{scale} = 1.0 + (10^{(handleValue)} - 1.0) * (1.0 - (k/k\text{NumSteps}))^8$$

Where "scale" is the resulting contribution for the handle being computed;

"handleValue" is the value of the point position on the bar in the range of −1 to +1 where −1 is the minimum position of the point, 0 is the center position, and +1 is the maximum position of the point;

"k" is the index of the handles being calculated starting with 0 which may be the handle selected for velocity change and ending with a handle at the end of a path segment, in which the index may be different for the right segment path and the left segment path; and "kNumSteps" is the total number of subsegments between handles indexed in a segment path.

Figure 9:
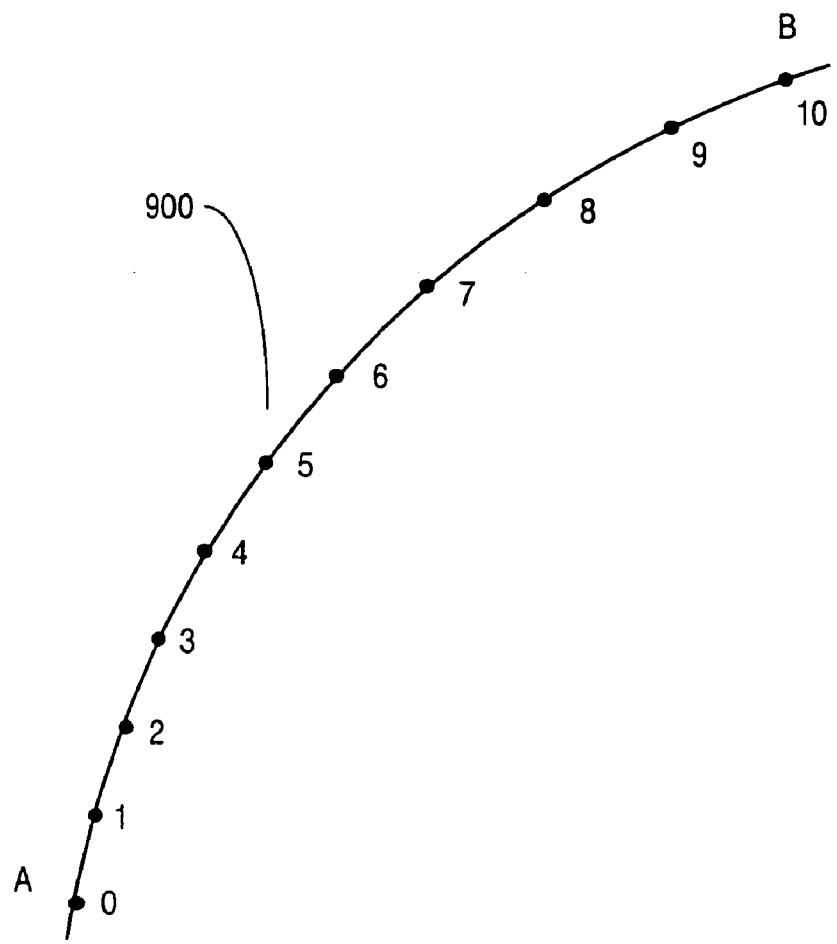
FIG. 9 illustrate another example of changing velocity according to another embodiment of the invention.

Note that the algorithm may be adjusted to fit the circumstances in which it is to be used. For example, the power base 10 of the handleValue may be a different base power or the power to the eighth in the algorithm may be a different power. Such adjustments may be made according to a desired result. In another example, as illustrated in FIG. 9, where a segment path is affected by two handles A, B, the algorithm may be modified to be:

Handle $A$: scale=$1.0+(10^{(handleValue\ A)}-1.0)*(1.0-(2k/k\text{NumSteps}))^8$ Handle $B$: scale=$1.0+(10^{(handleValue\ B)}-1.0)*((2k/k\text{NumSteps})-1.0)^8$ where handle A affects one half of the segment between handle A and handle B, and handle B affects the other one half of the segment. The handleValue A may be the value on the right bar (see FIG. 6) of handle A and handleValue B may be the value on the left bar of handle B. For the algorithm of handle A, k may range from 0 to 5 and for the algorithm of handle B, k may range from 6 to 10; and kNumSteps may be 10 (see FIG. 9).

In the foregoing specification, the invention has been described with reference to specific embodiments thereof. It will, however, be evident that various modifications and changes can be made thereto without departing from the broader spirit and scope of the invention as set forth in the appended claims. The specification and drawings are accordingly, to be regarded in an illustrative rather than a restrictive sense.

What is claimed is:

1. A method comprising:
generating a path on a display upon which an object will follow when activated, the path including a plurality of segments formed by a plurality of handles; and
controlling a velocity of said object moving on said path by adjusting a space between at least two adjacent handles, wherein an amount of the space along a segment between the at least two adjacent handles at least partially determines the velocity of the object moving along the segment of the at least two adjacent handles, and wherein adjusting said space between said handles is performed by moving a handle to a different position on said path.

2. The method of claim 1, further comprising adjusting a shape of the path to accommodate the different position of the handle according to a mathematical formula, in response to moving the handle to the different position.

3. The method of claim 2, further comprising automatically adjusting a number of handles along the path in response to adjusting the shape of the path to allow a space between two adjacent handles of the path to remain substantially identical with respect to a number of handles prior to adjusting the shape.

4. The method of claim 1, wherein moving said handle causes remaining handles to automatically adjust their spacing with adjacent handles according to a mathematical formula.

5. The method of claim 1, wherein adjusting said space between said handles further comprises:
in response to an input received from an activated handle, displaying a bar associated with the activated handle, the bar having at least one point; and
manipulating a position of the at least one point to cause a space between remaining handles to adjust with respect to the activated handle according to a mathematical formula.

6. The method of claim 5, wherein the bar is displayed within a proximity of the activated handle and is referenced to the activated handle.

7. The method of claim 5, wherein a segment of the bar defined by a first point and a second point is associated with a segment of the path having at least two handles, including the activated handle, and wherein manipulating a space between the first and second points on the bar changes a space between one of the at least two handles and the activated handle.

8. The method of claim 7, wherein a space of a remainder of the at least two handles is automatically adjusted according to a mathematical formula.

9. The method of claim 7, wherein a space between at least two remaining handles of the path other than the segment of the bar defined by the bar is automatically adjusted.

10. The method of claim 7, wherein a space between two adjacent handles within the segment of the path associated with the first and second points of the bar is substantially identical.

11. The method of claim 10, wherein the space between two adjacent handles within the segment of the bar is different than a space between at least two adjacent handles outside of the segment defined by the bar.

12. The method of claim 1, wherein controlling the velocity of the object comprising adjusting a color of at least a segment formed by two adjacent handles, and wherein different colors at least partially represent different velocities of the object moving along the at least one segment between the two adjacent handles.

13. The method of claim 1, wherein controlling the velocity of the object comprising adjusting a size of at least one handle, and wherein different sizes of the at least one handle at least partially represent different velocities of the object moving along a segment between two adjacent handles having different sizes.

14. The method of claim 1, further comprising adding an additional handle to the path in response to an input received via doubling clicking within a proximity of the path.

15. The method of claim 1, further comprising removing a handle from the path by dragging and dropping the handle being removed to a graphical representation representing a trash can or a recycle bin.

16. The method of claim 1, further comprising, in response to an input received by activating a segment of the path between two adjacent handles, displaying a graphical user interface (GUI) to allow a user to specify a velocity of the object moving along the activated segment of the path.

17. An apparatus comprising:
  means for generating a path on a display upon which an object will follow when activated, the path including a plurality of segments formed by a plurality of handles; and
  means for controlling a velocity of said object moving on said path by adjusting a space between at least two adjacent handles, wherein an amount of the space along a segment between the at least two adjacent handles at least partially determines the velocity of the object moving along the segment of the at least two adjacent handles, and wherein said means for adjusting said space between said handles includes means for moving a handle to a different position on said path.

18. The apparatus of claim 17, wherein said means for moving said handle further comprises means for causing remaining handles to automatically adjust their spacing with adjacent handles according to a mathematical formula.

19. The apparatus of claim 17, wherein said means for adjusting said space between said handles further comprises:
  in response to an input received from an activated handle, means for displaying a bar associated with the activated handle, the bar having at least one point; and
  means for manipulating a position of the at least one point to cause a space between remaining handles to adjust with respect to the activated handle according to a mathematical formula.

20. A data processing system, comprising:
  a processor; and
  a memory for storing instructions, when executed from the memory, cause the processor to perform operations, the operation including generating a path on a display upon which an object will follow when activated, the path including a plurality of segments formed by a plurality of handles and controlling a velocity of the object moving on the path by adjusting a space between at least two adjacent handles, wherein an amount of the space along a segment between the at least two adjacent handles at least partially determines the velocity of the object moving along the segment of the at least two adjacent handles, and wherein the operations further comprise moving a handle to a different position on said path.

21. The system of claim 20, wherein moving the handle causes remaining handles to automatically adjust their spacing with adjacent handles according to a mathematical formula.

22. The system of claim 20, wherein adjusting the space between the handles further comprises:
  in response to an input received from an activated handle, displaying a bar associated with the activated handle. the bar having at least one point; and
  manipulating a position of the at least one point to cause a space between remaining handles to adjust with respect to the activated handle according to a mathematical formula.

23. A machine readable medium having stored thereon data representing sequences of instructions, which when executed by a computer system, cause said computer system to perform a method comprising:
  generating a path on a display upon which an object will follow when activated, the path including a plurality of segments formed by a plurality of handles; and
  controlling a velocity of the object moving on the path by adjusting a space between at least two adjacent handles wherein an amount of the space along a segment between the at least two adjacent handles at least partially determines the velocity of the object moving along the segment of the at least two adjacent handles, and wherein adjusting a space between said handles is performed when a handle is moved to a different position on said path via a drag and drop operation.

24. The machine readable medium of claim 23, wherein moving said handles causes remaining handles to automatically adjust their spacing with adjacent handles according to a mathematical formula.

25. The machine readable medium of claim 23, wherein adjusting said space between said handles further comprises:
  in response to an input received from an activated handle, displaying a bar associated with the activated handle, the bar having at least one point; and
  manipulating a position of the at least one point to cause a space between remaining handles to adjust with respect to the activated handle according to a mathematical formula.

* * * * *

UNITED STATES PATENT AND TRADEMARK OFFICE
CERTIFICATE OF CORRECTION

PATENT NO. : 7,617,454 B2 Page 1 of 1
APPLICATION NO. : 11/184296
DATED : November 10, 2009
INVENTOR(S) : Randy Ubillos It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 985 days.

Signed and Sealed this

Nineteenth Day of October, 2010

David J. Kappos
*Director of the United States Patent and Trademark Office*